US008903646B2

(12) United States Patent
Althen et al.

(10) Patent No.: US 8,903,646 B2
(45) Date of Patent: Dec. 2, 2014

(54) METHOD AND DETERMINING SYSTEM FOR AUTOMATICALLY DETERMINING EMISSION LOCATIONS, AND METHOD AND TRAFFIC CONTROL SYSTEM BASED THEREON FOR IMMISSION-DEPENDENT TRAFFIC CONTROL

(75) Inventors: Sebastian Althen, München (DE); Paul Mathias, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/034,878

(22) Filed: Feb. 25, 2011

(65) Prior Publication Data

US 2011/0208414 A1 Aug. 25, 2011

(30) Foreign Application Priority Data

Feb. 25, 2010 (DE) ........................ 10 2010 002 348

(51) Int. Cl.
*G08G 1/00* (2006.01)
*G06F 15/00* (2006.01)
*G06Q 99/00* (2006.01)

(52) U.S. Cl.
CPC ........................ *G06Q 99/00* (2013.01)
USPC ........................ 701/411; 701/117; 702/150

(58) Field of Classification Search
USPC ........................ 701/411
See application file for complete search history.

(56) References Cited

U.S. PATENT DOCUMENTS 3,891,848 A * 6/1975 Fletcher et al. ............ 250/345
3,931,462 A * 1/1976 Exton ........................ 348/162
6,749,820 B2 * 6/2004 Hawks et al. ............ 423/243.08
6,864,983 B2 * 3/2005 Galle et al. ................ 356/437
6,865,926 B2 * 3/2005 O'Brien et al. ............ 73/23.27
7,016,037 B2 * 3/2006 Chrisp et al. .............. 356/328
7,047,111 B2 * 5/2006 Schliep et al. .............. 701/2
7,564,377 B2 * 7/2009 Kimchi et al. ........... 340/995.13

(Continued)

FOREIGN PATENT DOCUMENTS

JP 2001-283377 * 3/2000
JP 2001117811 * 4/2001
JP 2001283377 A * 10/2001 ............ G08G 1/07
JP 2006-163558 * 6/2006

OTHER PUBLICATIONS

F. Benvenuto and A. Marani, Neural Networks for Enviornmental Problems: Data Quality Control and Air Pollution NowCasting, Global Nest: the Int. J. vol. 2, No. 3, pp. 281-292, 2000 (Greece).*

Collins, Sue. A GIS approach to modelling small area variations in air pollution within a complex urban environment., Innovations in GIS: 2: Selected Papers from the Second National Conference. pp. 245-249 (1995).*

(Continued)

*Primary Examiner* — John R Olszewski
*Assistant Examiner* — Jean-Paul Cass
(74) *Attorney, Agent, or Firm* — Laurence A. Greenberg; Werner H. Stemer; Ralph E. Locher

(57) ABSTRACT

A method for automatically determining emission locations of selected emitted substances originating from a selected immission location. In this context, on the basis of input values which relate directly or indirectly to the emitted substances and by using defined rules of a propagation model suitable for determining propagation of the emitted substances, the emitted substances are traced back spatially, with accompanying indication of distribution values. Furthermore, a determining system carries out the determining method, and a traffic control system carries out a traffic control method.

10 Claims, 4 Drawing Sheets

(56) References Cited

U.S. PATENT DOCUMENTS

| | | | | |
|---|---|---|---|---|
| 8,010,300 | B1 * | 8/2011 | Stearns et al. | 702/24 |
| 8,121,798 | B2 * | 2/2012 | Lippert et al. | 702/24 |
| 8,294,899 | B2 * | 10/2012 | Wong | 356/437 |
| 2002/0072963 | A1 * | 6/2002 | Jonge | 705/13 |
| 2006/0241860 | A1 * | 10/2006 | Kimchi et al. | 701/208 |
| 2008/0195329 | A1 * | 8/2008 | Prince et al. | 702/23 |
| 2009/0088962 | A1 * | 4/2009 | Jones | 701/200 |
| 2009/0138187 | A1 * | 5/2009 | Mathias | 701/117 |
| 2010/0317420 | A1 * | 12/2010 | Hoffberg | 463/1 |

OTHER PUBLICATIONS

USPTO STIC search results dated Jul. 29, 2013.*

Seibert, P., “Source Reconstruction for the ETEX-1 Tracer Release with a Lagrangian Dispersion Model”, Proceedings of the EUROTRAC Symposium 2000, Mar. 2000, pp. 1-5, available for download at the following URL: http://www.boku.ac.at/imp/envmet/invmod.html.

* cited by examiner

METHOD AND DETERMINING SYSTEM FOR AUTOMATICALLY DETERMINING EMISSION LOCATIONS, AND METHOD AND TRAFFIC CONTROL SYSTEM BASED THEREON FOR IMMISSION-DEPENDENT TRAFFIC CONTROL

CROSS-REFERENCE TO RELATED APPLICATION

This application claims the priority, under 35 U.S.C. §119, of German application DE 10 2010 002 348.5, filed Feb. 25, 2010; the prior application is herewith incorporated by reference in its entirety.

BACKGROUND OF THE INVENTION

Field of the Invention

The present invention relates to a method for automatically determining emission locations of selected emitted substances originating from a selected immission location, and associated therewith a determining system for the same purpose. Furthermore, the invention relates to a method and to a traffic control system for immission-dependent traffic control in a traffic area, in which both the above-mentioned method and the above-mentioned determining system can be used.

Emissions which are generated as a result of traffic form, depending on the type of substances, a large proportion of the environmentally relevant pollutants which are generated by combustion. For example, approximately 90% of the emissions of fine dust particles and soot particles in Germany in 1999 were caused by traffic, as were over 50% of the emissions of nitrogen oxides. The effects of these emissions are often felt as immissions at different locations, the immission locations, than at the emission locations at which they were emitted.

The propagation of pollutants, in particular of air-born pollutants, often depends of the type of substances and on the wind conditions and weather conditions as well as on the relief of a landscape including the buildings and vegetation present. Complex propagation models can be used to calculate the immission situation on the basis of the emission situation and, if appropriate, further complex influencing factors. It is therefore possible to create an immission map if the discharge quantities and locations of emissions are known. What are referred to as hotspots, i.e. locations with a particularly high concentration of the respective pollutants, can then be indicated on this map for various pollutants.

Another way of determining such hotspots is to measure the emissions by measuring devices. These devices are distributed over a measuring area and determine the pollutant concentrations locally. Such a hotspot which is well known is, for example, in Germany, a measuring station at the Landshuter Allee in Munich, at which concentrations of fine dust which exceed the permissible values are often measured.

When limiting values are exceeded, there is a need for action in order to protect the population and the environment. Therefore, traffic-regulating measures are employed nowadays, such as, for example, in Germany the introduction of the fine dust sticker in what are referred to as environmental zones. However, these measures do not tackle the cause of immissions directly because until now only blanket interventions have been carried out in the hope of alleviating the immission situation at the hotspot. It would appear that a targeted and more effective way of counteracting immission situations which exceed limiting values will require the origin of the emissions causing the immission situation to be detected.

SUMMARY OF THE INVENTION

It is accordingly an object of the invention to provide a method and a determining system for automatically determining emission locations, and a method and a traffic control system based thereon for emission-dependent traffic control which overcome the above-mentioned disadvantages of the prior art methods and devices of this general type, which permits improved traffic control in dependence on environment data.

Accordingly, in a method for automatically determining emission locations of selected emitted substances originating from a selected immission location on the basis of input values which relate directly or indirectly to the emitted substances and by using defined rules of a propagation model suitable for determining propagation of the emitted substances, the emitted substances are traced back spatially, with accompanying indication of distribution values.

Both emission locations and immission locations are generally defined in this context as location information with an extent which can be selected as desired. This means that such locations can be points, for example measuring points, but also, for example, sections of road, referred to as network links, or even urban districts. Environmentally relevant pollutants are preferably defined as emissions or immissions in the context of the invention. Pollutants are in turn all those substances and/or mixtures of substances which, according to scientific but also subjective opinion, are likely to cause damage to people and/or nature and/or buildings and/or processes in the earth's atmosphere. The particular focus is placed here on the pollutants which can cause such damage to the immission location. The method according to the invention preferably takes into account here pollutants which are emitted by transportation, particularly by land transportation, here in particular by transportation which are driven by internal combustion engines. Particular emphasis is placed here on individual means of land transportation. This concentration is due, on the one hand, to the fact that land-based individual traffic is, on the one hand, a main source of immissions which can be measured at immission locations in the vicinity of the ground and which can therefore cause the abovementioned damage. On the other hand, emissions of pollutants by these particular means of transportation can be particularly effectively counteracted by suitable traffic control measures. Basically, the determining method according to the invention can also be applied in the context of industrially related emissions, and the method can take into account such emissions.

A large number of data items can be used as input values for carrying out the method according to the invention. Input values which contain emission information and/or immission information are considered to be input values which are related directly to the emitted substances. This information may contain both measured values and values from simulations and models. All those input values which can be derived by calculation methods, for example on the basis of emission models and/or emission information, are related indirectly to emitted substances. In particular, it is preferred that these input values are at least partially traffic-related. They can therefore contain emission values which are due at least partially to traffic-related pollutants and/or contain, for example, counted values and/or estimated values for traffic, such as numbers of cars or speed distributions.

The invention uses these input values and applies rules of a suitable propagation model for the emitted substances to which reference is made. The rules of this propagation model are, however, not necessarily used to determine propagation of emissions. They can instead also be used in a type of back-calculation in order to work back from the location where the pollutants are effective, the immission location, to the location where they are produced, that is to say the emission location, on the basis of the logic of the model. This can be done, for example, by reversing the rules, i.e. using the inverse rules of this propagation model, if appropriate supplemented by further rules which serve to refine the determining method. Alternatively or additionally it is possible to mark emitted substances as a function of their origin (see below) so that after the propagation model has been applied it is possible to determine the place where the emissions originated from on the basis of the markings.

A third variant which can also be used as an alternative or addition to the abovementioned variants is to determine emission values at emission locations and immission values at least one immission location by measurement and/or simulation, and then to select a propagation model which models the propagation of the determined emissions in the direction of the immission locations. As a result, there is at least a relatively high probability of making a correct assignment of emission locations and immission locations.

There are a large number of propagation models whose rules can be applied for use within the scope of the method according to the invention.

Examples of this are:

a) the model MISKAM which, in addition to other models which can also be used, is described in more detail in the article by Lohmeyer, A. et al: Modelle zur Berechnung der Luftqualität and ihre Anwendung [Models for Calculating Air Quality and Their Application].

MISKAM stands for “microscale flow and dispersion model” and represents a three-dimensional and non-hydrostatic type of model, which allows for making a prognosis of wind distribution in built-up areas and for determining air pollutant concentrations. It can be used e.g. for street canyons, in the vicinity of multi floor parking houses or underground garages, in the vicinity of high rise buildings, etc. MISKAM is based on the Eulerian dispersion equation.

b) the model on which the program WinKFZ is based and whose functions are now explained.

WinKFZ is a system for simulating the atmospheric dispersion of traffic-related emissions on inner-city streets and motorways, and helps assess the resulting traffic-induced immissions. The emissions can be neutral or heavy gases, and are released from point-shaped, line-shaped or diffuse emission surfaces. WinKFZ allows the user to create and edit streets, buildings and other scene elements. The system then incorporates meteorological statistics and topographical information to simulate the particle dispersion and resulting immission impact using numerical models.

c) the model IMMIS represents a propagation model related to immission climatology for determining air pollution in two-dimensional areas. The model is based on the concept of Gaussian distribution and uses the Gaussian plume model. It describes processes of dilution and transport of pollutants deriving from sources of different shape and size. IMMIS allows for determining the distribution of emissions and pollutants in urban areas, e.g. in street canyons.

Such models may take into account a large number of factors for the propagation of pollutants which are transported by airstreams. These include, inter alia, meteorological factors (wind direction and wind speed, temperature, inversion weather situations and much more), roads (relief, road category and much more), the emissions themselves (for example according to the HBEFA—Handbuch für Emissionsfaktoren des Umweltbundesamts [Emission Factor Manual of the German Federal Environmental Office]), structural elements (buildings, noise protection measures and much more, which influence the propagation of pollutants, and much more), the topography in the area investigated, as well as the receptors and the actual pollutants which are to be calculated. This comprehensive listing makes it clear that the formation of models in this field of application has reached a certain degree of sophistication which the invention now utilizes for the purpose of tracing back.

Generally, within the scope of the invention, the term model is differentiated from that of calculation method or simulation method in that a model makes available the logistical bases for carrying out a calculation method or simulation method. It is based for this purpose on rules which can be used to further process input data, for example emission values or—in the case of an emission model—traffic data. In addition, basic assumptions can already be stored in the model, for example information about the topology of an area under investigation and much more. In the case of a propagation model, the abovementioned influencing factors are used, for example, as input data in the model.

The emitted substances are traced back spatially. In this context, distribution values which inform a user as to how many emitted substances which can be determined at a defined immission location originate from a specific emission location are determined and specified. Such distribution values can be submitted, for example, as probability information which indicates the probability of a pollutant particle or a group of such particles originating from the emission location. Alternatively and/or additionally, absolute values can be submitted in the form of quantity information for pollutants from an emission location and/or relative values as proportional information. The selection of the parameter under investigation (probability, absolute or relative information, etc.) depends here in particular on the selected propagation model and the specific tracing-back method used, as will be shown in more detail below.

With the method according to the invention it is therefore possible to determine, as a function of an immission location, one or more emission locations, from which an immission or emission which is determined by measuring technology and/or calculated by simulation originates. The method therefore uses an already available logic, specifically that of the respectively selected propagation model, with the result that no completely new model formation is necessary in order to arrive at the desired knowledge. It can therefore be made available relatively easily and cost-effectively and can also be carried out easily given corresponding programming. The reliability of the generated determination data depends essentially on the accuracy of the selected propagation model; when a highly accurate propagation model is used, the accuracy can therefore be of a similarly high level to that of the propagation model itself. In addition, further refinement of a selected propagation model brings about virtually automatically an increase in the accuracy of the results of the method according to the invention.

The invention also contains a method for immission-dependent traffic control in a traffic area, in which control signals for controlling the traffic at an emission location are generated, the control signals being determined automatically on the basis of an immission location at which emitted substances from this emission location can be determined as immissions.

The novel feature of this traffic control method is therefore quite principally to determine, on the basis of an immission location, the corresponding emission locations and not, as previously, to take traffic control measures either at the immission location or non-specifically over a large traffic area. Instead, the traffic control is carried out at least with priority, i.e. with emphasis at the determined emission location, and in the case of a plurality of determined emission locations it is preferably carried out at this plurality of locations, particularly preferably with weighting as a function of determined distribution values for the emissions among the individual emission locations. In addition it is possible to provide for the traffic control to be carried out with emphasis or exclusively at selected determined emission locations, in particular if means which are sufficient only in these areas are present for corresponding traffic control.

Within the scope of the traffic control method according to the invention, the emission location is particularly preferably determined by applying a determining method according to the invention, since, as explained above, the logic of this method makes the necessary data simply and accurately available at the emission location.

A determining system according to the invention for automatically determining emission locations of selected emitted substances originating from a selected immission location contains at least an input interface for input values of the abovementioned type which relate directly or indirectly to the emitted substances, and a determining unit which during operation uses rules of a propagation model suitable for determining propagation of the emitted substances to carry out spatial tracing back of the emitted substances on the basis of the input values, with accompanying indication of distribution values, preferably an output interface for outputting the distribution values and/or location information on the determined emission locations.

In addition to this, the determining system can also contain a selection data input interface for feeding in selection data on selected emitted substances. The selection data input interface can be implemented as a user input interface, but also as an input interface for selection data from a database which is kept available, for example, for specific emitted substances to be checked for a specific examination area. The database can also be arranged within the determining system, for example in the form of a data memory.

Furthermore, the determining system can have an immission location selection unit for selecting an immission location, which immission location selection unit preferably automatically selects a suitable immission location, for example a hotspot of the type specified above, on the basis of which hotspot the emission location is to be determined.

A traffic control system according to the invention for immission-dependent traffic control in a traffic area has a control unit which during operation generates control signals for controlling traffic at an emission location, and a determining system which is configured in such a way that during operation it automatically determines the emission location on the basis of an immission location at which emitted substances from the emission location can be measured as immissions.

In order to carry out the traffic control method according to the invention, a computer program product which can be loaded directly into a processor of a computer device is therefore also preferably used, the computer program product having program code to carry out all the steps of such a traffic control method.

It is particularly preferred that the traffic control system according to the invention contains a determining system according to the invention.

Both in a determining system according to the invention and in a traffic control system according to the invention it is possible to implement, in particular, the determining unit either as a stand-alone individual component, by hardware and/or software, or it can be integrated together with other units within an electronic processor module. It can be implemented entirely or partially on a computer of the traffic control system. Furthermore, the input interface and, if appropriate, further interfaces can be embodied either as hardware in the form of input sockets or output sockets or wireless interfaces of a device, or in the form of software or as a combination of hardware and software components. Interfaces, for example in the form of pure software interfaces, can also receive data directly from the traffic control system or from the determining system if, for example, the determining system is arranged on the same computer as the traffic control system. The interfaces can also be embodied as combined input/output interfaces.

One design of the determining system and/or of the traffic control system in the form of software has the advantage of a rapid and cost-effective implementation. Therefore, in order to carry out the methods according to the invention a computer program product is preferably used which can be loaded directly into a processor of a computer device, with program code for carrying out all the steps of such a respective method.

Further particularly advantageous embodiments and developments of the invention can also be found in the dependent claims and the following description. Here, the methods according to the invention can also be developed in accordance with the dependent claims relating to the systems, and vice versa, wherein the features of the methods can also be used to develop the two systems, and vice versa, unless explicitly stated otherwise.

The immission location is preferably selected from a listing of a multiplicity of specific immission locations, the assigned immission values of which have been determined on the basis of application of the same propagation model. The propagation model therefore serves both to determine immission locations and to determine immission values which are present at these immission locations, as well as to determine the emission locations corresponding to these immission locations. The immission values relate here to quantity information, volume information and proportion information for specific emitted substances, such as can be determined at the immission location, i.e. can be derived by measurement or suitable calculation methods.

As mentioned, one of the advantages of the invention is due to the fact that an already existing propagation model can be used to determine emission locations. The use of the same model serves not only to save resources but also contributes decisively to achieving a high level of consistency and rigor in the statements. In this context, in the application of the propagation model, locally assigned emission values, which are determined and/or simulated on the basis of measured data, are particularly preferably used as input values. Such emission values can be based directly on real measurements at the emission sources. However, they can also be derived from other measured data, in road traffic for example traffic measured data such as the traffic density using emission simulation methods. A simulation model which can be used for this is, for example, the HBEFA mentioned above.

The German Federal Environmental Office publishes the emissions factor manual at regular intervals. This comprehensive database for the emissions of air-born pollutants from road traffic compiles emission factors of motor vehicles for the most important air-borne pollutants and fuel consumption. The data are organized according to numerous technical and traffic parameters such as type of vehicle (passenger car, truck, bus, etc.), emission control (regulated, unregulated catalytic converter, etc.), type of drive (spark ignition, diesel) and traffic situations (road traffic, country road, freeway, etc.). In addition, it is possible to determine the different proportions of the pollutant emissions which arise from goods traffic and passenger traffic, respectively. Furthermore, with the version for Germany it is also possible to display the fleet mix on German roads, graphically or in the form of tables.

It has proven particularly advantageous—because it is particularly reliable in terms of the database—if input values contain traffic measured data which are determined on a real-time basis for a traffic situation. These traffic measured data, for example information about the number and/or speed of vehicles, about traffic jams and much more, are preferably obtained from current traffic measurements. Alternatively or in addition it is also possible to use real measured data stored in databases, in particular those which are congruent with the current situation at the time of determination of the emission location in as many reference parameters as possible (for example time of day, day of week, weather situation). An emission situation is then derived from the traffic measured data, and an immission situation is then derived therefrom by the propagation model. The immission locations for which determination of the associated emission locations is particularly important are then obtained from this immission situation for a user and/or an automatic detection system.

An immission diagram, i.e. in particular an immission map, or an immission matrix, from which the immission values at specific immission locations can be respectively obtained, is preferably produced during the application of the propagation model. This simplifies for a user the selection of an immission location which is suitable for the information in which he is interested, and also speeds up the method. In particular, immission diagrams can be operated intuitively and often indicate at a glance where, for example, hotspots of the abovementioned type are located.

One particular information advantage is obtained if the selection of an immission location is carried out—preferably automatically—on the basis of local or regional concentration values, present and/or calculated at this immission location, for a number of the emitted substances. This number can be composed of an individual substance or of a group of substances which are to be preferably assigned to a common pollutant group. Hotspots and/or locations at which loading limiting values are exceeded are therefore determined, for example, with respect to individual immissions to be taken into account. On the basis of such locations with high or even peak loading it is possible to determine emission locations in which there is emission of pollutants which contributes particularly strongly to limiting values being exceeded, and therefore generally to damage.

According to one preferred embodiment of the invention, during the application of the propagation model, emissions are provided with markings, particularly preferably with unambiguous markings, in accordance with their origin. The markings may be stored, for example, as characteristic values or in the form of identification numbers, advantageously supplemented with information on the time of emission of the emission. The data can also refer here to particle clouds or clusters and can also be broken down according to a type of particle (size, weight or the like) and/or particle group (in particular substance group). Individual particles are particularly preferably marked with origin markers which are dependent on their emission location. Each particle can therefore also be easily traced back again, which can significantly increase the quantification in the form of distribution values and local or spatial assignment accuracy to the emission locations. In addition, the emissions can be traced back very easily: the emissions or particles can be plotted in a histogram according to the location of origin.

One positive additional effect can be achieved if, in addition to the emission locations, classes of emitters of the selected emitted substances are determined. These classes can relate, for example, to vehicle classes of the German Federal Motor Vehicle Registration Agency or to drive classes or engine classes or can even be broken down to individual vehicle types, if appropriate even classified according to approval data and much more. With such refinement of the assignment of emissions, the database is made available which can be used, for example, for even more targeted traffic control. For the determination of vehicle classes, the use of a propagation model on the basis of the abovementioned origin markings is particularly advantageous since the origin can also be encoded according to vehicles in a marking.

Furthermore, in addition to the emission locations and, if appropriate, the vehicle classes, emission times of the selected emitted substances can be determined. This makes it possible to display the time-dependent emission profile for the emissions, which can play a significant role in particular for estimation of the effectiveness of traffic-control measures. It is therefore possible, for example, to measure pollutants in calm conditions at an immission location at a time which is long after the time of generation. A current intervention into the traffic situation at the emission location may therefore make no sense at all under certain circumstances. On the other hand, time curves can also be determined from which preventative traffic-controlling measures can already be derived in advance of possible exceeding of limit values at a later time.

As far as the determined emission locations are concerned, they can be advantageously emphasized graphically on any map, preferably encoded by colors or contrasting representation as a function of the proportions which they form in the overall immissions at the immission location. In combination with the representation of a plurality of immission locations on such a map it is possible to derive therefrom a clearer representation for a user, from which the user can, for example, recognize which emission locations have a high degree of relevance for a plurality of immission locations. Such a map can also be constructed in an interactive way by a user interface, for example by virtue of the fact that a user uses a mouse cursor to mark an immission location on the map, and in this regard information on the corresponding emission locations is automatically displayed to the user.

In addition, within the scope of the method it may be advantageous to select a plurality of immission locations and to treat them as a single immission location for the determination of emission locations. The result is then a listing of which emission locations can be assigned to this plurality of immission locations, with the result that traffic control takes place not only for the purpose of alleviating the immission situation at an individual selected hotspot. This can result in traffic control with more global and nevertheless selectively acting measures.

As far as the traffic control method according to the invention is concerned, it is preferred that the control signals also contain additional information for road users, preferably at the emission location, and/or residents, preferably at the immission location, affected by the traffic control, the information relating to quantification and/or representation of propagation on the basis of spatial tracing back of the emitted substances. The road users are therefore provided with information which makes the purpose of the technical traffic control measure plausible to them, which should lead to an increase in compliance with traffic rules. Residents are provided with information as to which measures are being selectively taken for them, for example in order to quickly eliminate an instantaneous pollution situation.

Other features which are considered as characteristic for the invention are set forth in the appended claims.

Although the invention is illustrated and described herein as embodied in a method and a determining system for automatically determining emission locations, and a method and a traffic control system based thereon for emission-dependent traffic control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
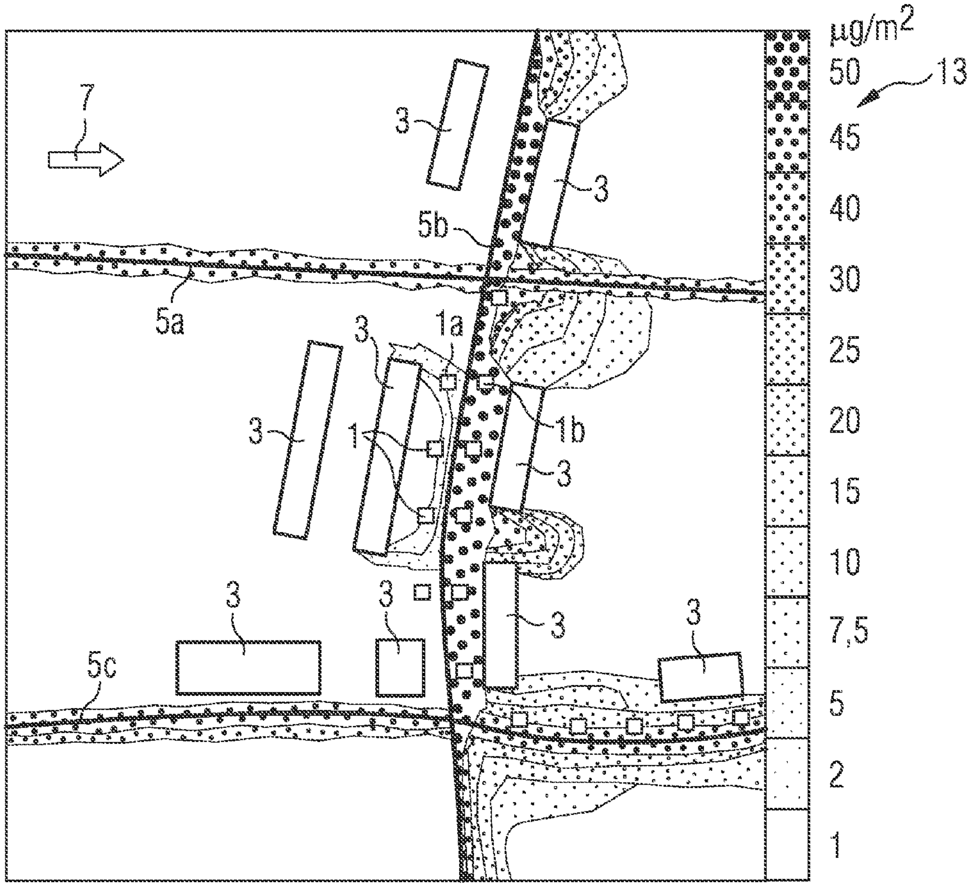
FIG. 1 is a schematic map showing a locality with two intersecting roads with gray-value-encoded representation of pollutant loading.

Referring now to the figures of the drawing in detail and first, particularly, to FIG. 1 thereof, there is shown a detail from a map 13 in which the daily average value of fine dust concentration, measured in $\mu g/m^2$, is represented with gray value encoding (see the schematic gray value scale at the side). The map 13 is represented with a north-south orientation. A wind direction is indicated by a directional arrow 7. It runs from west to east here. It is possible to see three roads 5*a*, 5*b*, 5*c*, the first road 5*a* and the third road 5*c* of which run approximately in an east-west direction, and the second road 5*b* of which runs approximately in a north-south direction, with the result that two intersections are produced, one of the first road 5*a* with the second road 5*b*, and one of the third road 5*c* with the second road 5*b*. Above the third road 5*c*, on both sides of the second road 5*b*, there is a locality, composed of a plurality of buildings 3.

Propagation occurs of pollutants such as carbon monoxide, nitrogen oxides, fine dust particles, soot, sulfur dioxide and many others, which are caused by the traffic on the roads 5*a*, 5*b*, 5*c*. This occurs on the basis of a propagation logic which can be modeled in the form of a number of propagation rules in a propagation model. The pollutants can be determined by pollutant sensors 1, 1*a*, 1*b* which are positioned along the roads 5*a*, 5*b*, 5*c*. As a rule, only a significantly smaller number of such sensors is installed in such a small traffic area. A decisive factor for the quantity of pollutants which can be measured at a pollutant sensor 1, 1*a*, 1*b* is its installation location. This can be recognized from the example of the two pollutant sensors 1*a*, 1*b* which are installed opposite one another on the two sides of the second road 5*b*. The further pollutant sensor 1*a* which is installed in the west is located in the wind shadow of a building 3 and measures only a very small fine dust concentration in the wind situation which is present here. In contrast, the pollutant sensor 1*b* which is installed further to the east determines, only a few meters away from the pollutant sensor 1*a*, a fine dust concentration of at least 50 $\mu g/m^2$, that is to say more than ten times as much as on the opposite side of the road.

This instructive example illustrates why the determination of pollutant concentrations is nowadays no longer carried out exclusively by sensor systems. Often instead or in addition propagation models are used which, for example, also take into account a wind shadow, caused by a building 3, in the assignment of virtual pollutant measured values.

Figure 2:
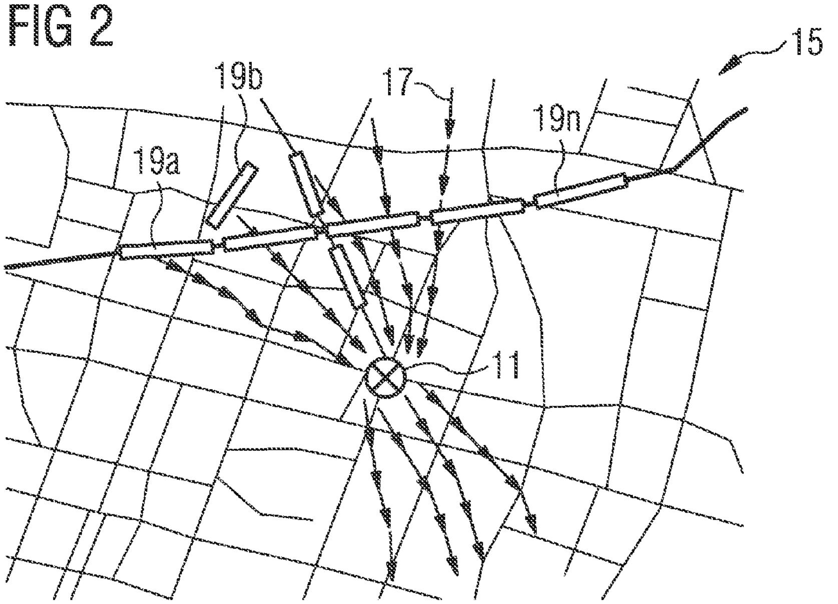
FIG. 2 is a schematic map showing a built-up area with representation of emission locations and direction indicators of a propagation model.

FIG. 2 shows a schematic map of a traffic area 15 of a built-up area, in which map a plurality of road sections are highlighted as emission locations 19*a*, 19*b*, . . . , 19*n*. In addition, directional arrows 17 are plotted which represent schematically the logic of a propagation model for emissions. Owing to this propagation behavior which is determined by a simulator, a particularly high pollutant concentration occurs at a hotspot 11. The hotspot 11 can be used as a starting point within the scope of the determining method according to the invention in order to determine emission locations from which the pollutants which can be measured as immissions at the hotspot 11, in proportions (which are determined or are to be determined) originate.

This is carried out in a variant of the invention by tracing back the pollutant streams with the same logic as that in the propagation model used. Considered in figurative terms, this logic follows the illustrated arrows in the reverse direction until it comes to the associated emission location 19*a*, 19*b*, . . . , 19*n*. Ultimately, by using the propagation model and applying it in the reverse direction, it is possible to assign a number of emission locations to each location which is defined as an immission location on the map. In addition to this, the proportions of the emissions from a specific emission location which are responsible for the overall immissions at the immission location can be determined and displayed in percentage terms and/or absolute terms. Another variant for the tracing back of pollutants constitutes the above-described marking of emissions according to their origin and the subsequent installation of these emissions in a histogram.

In one visualization example, an immission map can be displayed to a user on a graphic user interface. When a marking instrument, such as a computer mouse cursor, is positioned at any desired location, for example a hotspot, on the user interface, all those road sections, i.e. emission locations, which contribute a relevant proportion of the immission loading at this immission location, would be highlighted. Depending on the proportion of the overall loading, color encoding or contrasted representation encoding of the emission locations can be carried out, for example on a green/yellow/red scale.

The knowledge of the emission locations from which immissions at a specific hotspot originate can be used to derive traffic control measures for the emission locations, for example: the traffic flow on the corresponding sections of road is freed up by minimizing the vehicle stops, for example by corresponding light signal control, and/or traffic flows are moved from one section of road into other areas which are less critical for the loading of the hotspot with pollutants, by light signal systems, variable road signs and traffic information services.

Knowledge of the emission locations therefore permits implementation of very selective deactivation measures for preventing pollutant concentration values from being exceeded at specific immission locations. If a fine propagation model is already used for determining the immission locations, it is also possible to ensure that the examination actually determines the correct hotspots and not those which in reality do not represent the full extent of an immission situation in a traffic area.

Figure 3:
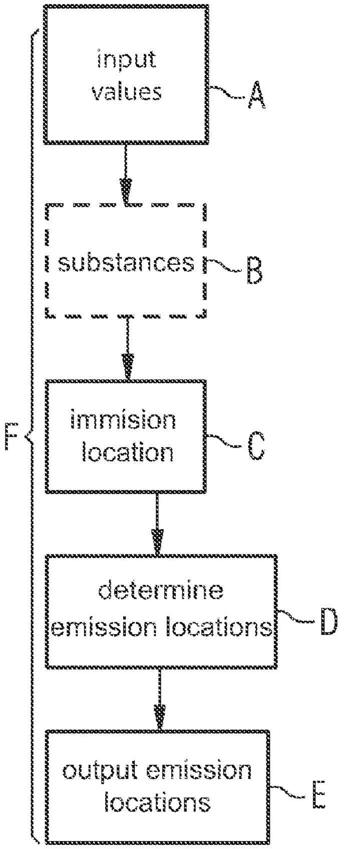
FIG. 3 is a block diagram showing an exemplary embodiment of a determining method according to the invention.

FIG. 3 shows a schematic block diagram of the sequence of an exemplary embodiment of a method according to the invention F for determining emission locations 19*a*, 19*b*, . . . , 19*n*. In a step A, input values are input into the method, for example in the form of traffic data. It is optionally possible for step B to additionally include a selection as to which emitted substances are to be taken into account in the method. Step C includes the inputting or definition of an immission location 11, for example of a hotspot, for which emission locations 19*a*, 19*b*, . . . , 19*n* are to be subsequently determined. This definition can take place in an automated fashion or by a user input. In step D, the emission locations 19*a*, 19*b*, . . . , 19*n* from which the immissions at the immission location 11 originate are determined on the basis of the rules of a suitable emission propagation model by tracing back. The emission locations 19*a*, 19*b*, . . . , 19*n* are output to a user in a step E.

Figure 4:
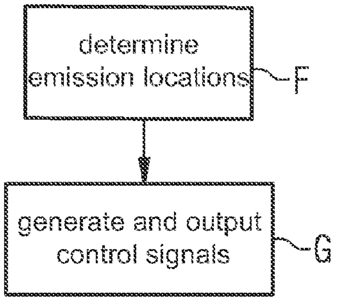
FIG. 4 is a block diagram showing an exemplary embodiment of a traffic control method according to the invention.

FIG. 4 is a schematic view of the sequence of an exemplary embodiment of a traffic control method according to the invention. Here, first in a step F emission locations 19*a*, 19*b*, . . . , 19*n*, which are to be assigned to a selected immission location, are determined. However, in step G control signals by which a controlling intervention into the traffic is made are generated and output for these emission locations 19*a*, 19*b*, . . . , 19*n*, at least for one of the emission locations 19*a*, 19*b*, . . . , 19*n*.

Figure 5:
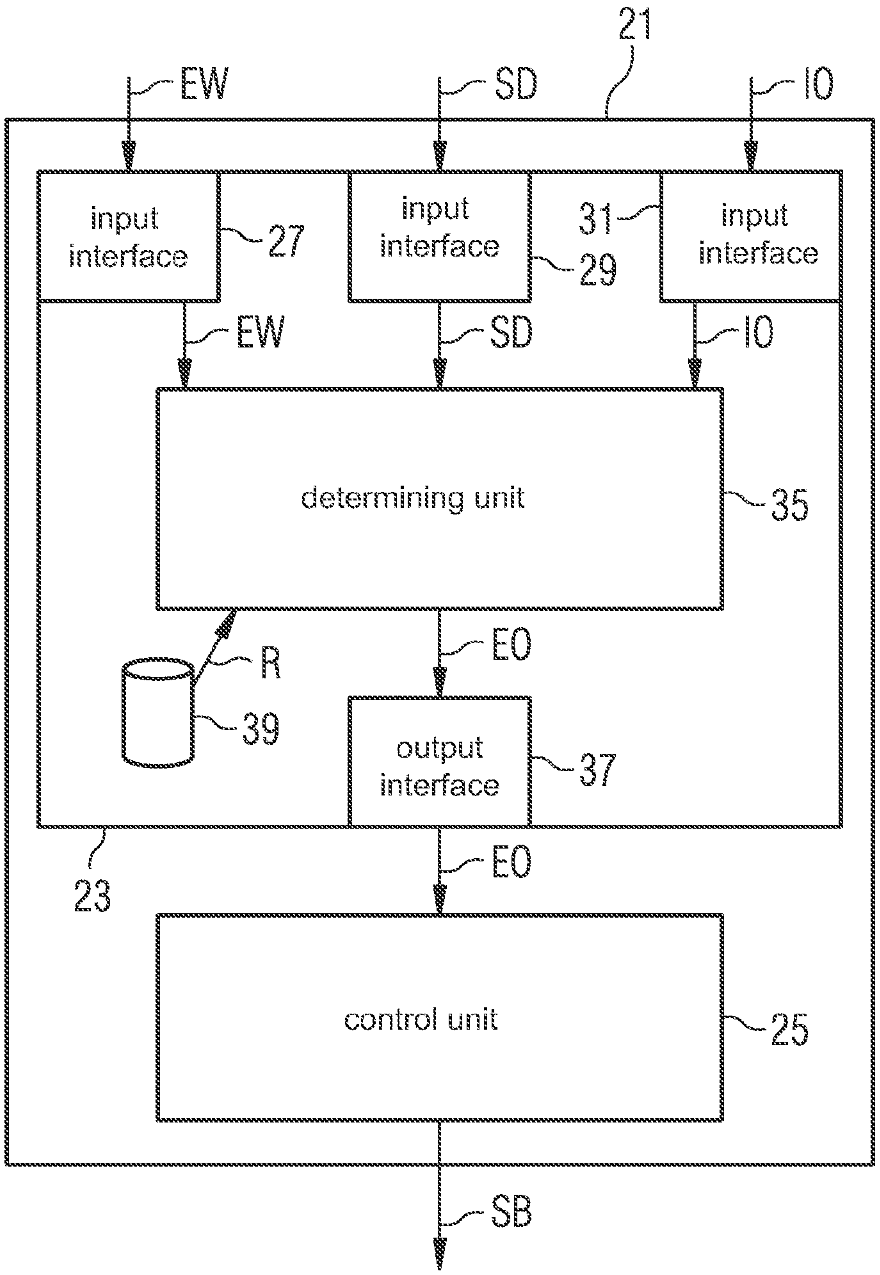
FIG. 5 is a block diagram showing an exemplary embodiment of a traffic control system according to the invention together with an exemplary embodiment of a determining system according to the invention.

FIG. 5 shows a schematic block illustration of exemplary embodiments of a traffic control system 21 according to the invention and of a determining system 23 according to the invention. The determining system 23 forms, together with a control unit 25, the traffic control system 21 which is implemented in the form of software modules on a processor.

The determining system 23 has an input interface 27 for feeding in input values EW, and an input interface 29 for feeding in pollutant data SD. The pollutant data SD contains information on which pollutant types are to be taken into account in an investigation. A third input interface 31 serves to feed in selection data IO on immission locations to be investigated. In one determining unit 35, emission location information EO is generated on the basis of these inputs EW, SD, IO and using rules of an emission propagation model which are stored in a storage medium 39. These data include information on which emission locations can be assigned to the respectively selected immission location, and on the distribution values with which they can be assigned. By an output interface 37, the emission location data EO are passed onto the control unit 25, which on this basis derives control signals SB for one or more of the determined emission locations, which control signals SB are used to perform selective traffic control in this area.

Figure 6:
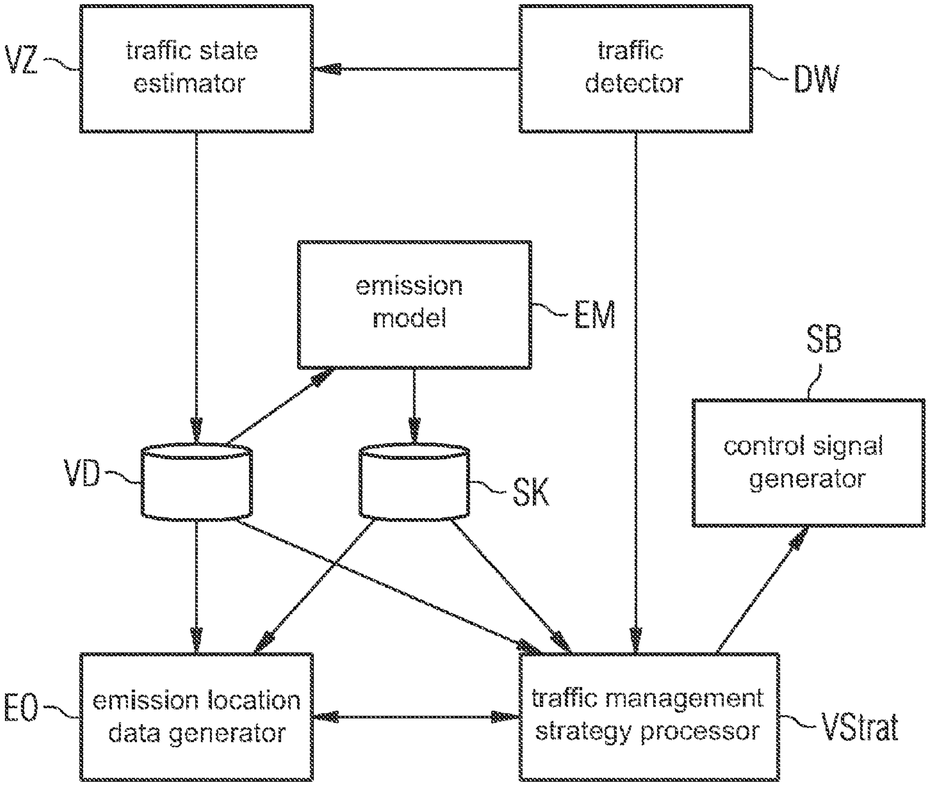
FIG. 6 is a block diagram showing sequences within a traffic management system using the determining system and traffic control system according to the invention.

FIG. 6 shows a sequence logic within a traffic management system using the methods according to the invention. Traffic detectors generate traffic detector measured values DW from which traffic data VD are derived via a traffic reconfiguration model or a traffic state estimator VZ. The traffic data VD represent a traffic state in a traffic area, for example on a section of road. Pollutant concentrations SK at specific immission locations, for example the hotspots, ultimately therefore immission data, are generated on the basis of the traffic data VD using a suitable emission model EM. The immission data are included in the determination of emission locations, resulting in emission location data EO which contain information as to how many proportions of the pollutant concentrations SK at an immission location originate from a specific emission location. These data are input into the processing of a superordinate traffic management strategy VStrat. This results in an interaction since the traffic management strategy VStrat has effects on the emission locations. The strategies are implemented by control signals SB.

Finally, reference will be made once more to the fact that the methods which are described in detail above and the illustrated systems are merely exemplary embodiments which can be modified by a person skilled in the art in a wide variety of ways without departing from the scope of the invention. Furthermore, the use of the indeterminate article "a" does not rule out the possibility of a plurality of the affected features also being present. Furthermore, "units" may be composed of one or more components, which are also arranged in a spatially distributed fashion.

The invention claimed is:

1. A method for immission-dependent traffic control in a traffic area, which comprises the steps of:

determining emitted substances emitted at an emission location, via at least one of sensors at an immission location, wherein the determining the emitted substances is performed by sensors at the immission location;

providing a traffic control system having a computer for generating control signals for controlling traffic at the emission location, the control signals being determined automatically on a basis of the immission location at which the emitted substances from the emission location can be determined as immissions, the emission location and the immission location being separate and independent locations and the emitted substances being traced back from the immission location to a source of the emitted substances being the emission location, wherein the control signals including information for residents affected by traffic control, the information relating to at least one of quantification or representation of propagation on a basis of spatial tracing back of the emitted substances, and the control signals being communicated to the traffic control system to alleviate the traffic and control traffic lights; and determining, via the computer, the emission location by applying a determining method for automatically determining emission locations of the emitted substances originating from the immission location, which includes tracing back spatially the emitted substances, with accompanying indication of distribution values, on a basis of input values relating directly or indirectly to the emitted substances and via a propagation model suitable for determining propagation of the emitted substances, the propagation model taking into account at least one of the following factors for determining the emission location of the emitted substances transported by airstreams: wind direction, wind speed, temperature, inversion weather situations, road categories, emission types, structural elements, and topography between the emission location and the immission location, and wherein in an application of the propagation model, locally assigned emission values, which are at least one of determined or simulated on a basis of measured data, are determined as the input values.

2. The method according to claim 1, wherein the input values contain traffic data, based on the measured data, of a traffic situation.

3. The method according to claim 1, which further comprises selecting the immission location on a basis of local or regional concentration values, at least one of present or calculated at the immission location, for a number of the emitted substances.

4. The method according to claim 1, which further comprises during an application of the propagation model, providing emissions with markings in accordance with their origin.

5. The method according to claim 4, which further comprises marking individual particles with origin markers which are dependent on their emission location.

6. The method according to claim 1, which further comprises, in addition to the emission locations, determining classes of emitters of the emitted substances.

7. The method according to claim 1, which further comprises, in addition to the emission locations, determining emission times of the emitted substances.

8. The method according to claim 1, which further comprises selecting the immission location from a listing of a plurality of specific immission locations, assigned immission values of which have been determined on a basis of application of the propagation model.

9. The method for controlling traffic according to claim 1, wherein the control signals include information for at least one of road users or residents affected by traffic control, the information relating to at least one of quantification or representation of propagation on a basis of spatial tracing back of the emitted substances.

10. A traffic control system for immission-dependent traffic control in a traffic area, the traffic control system comprising:

sensors for determining emitted substances at an immision location;

a control unit which during operation generates control signals for controlling traffic at an emission location, wherein the control signals including information for residents affected by traffic control, the information relating to at least one of quantification or representation of propagation on a basis of spatial tracing back of the emitted substances, wherein the control signals are communicated to the traffic control system to alleviate the traffic and control traffic lights; and a determining system embodied such that during operation said determining system automatically determines the emission location on a basis of an immission location at which emitted substances from the emission location are measured, via at least one of said sensors, as immissions, the emission location and the immission location being separate and independent locations and the emitted substances being traced back from the immission location to a source of the emitted substances being the emission location, said determining system having an input interface for input values relating directly or indirectly to the emitted substances, and a determining unit which during operation implements a propagation model suitable for determining propagation of the emitted substances to carry out spatial tracing back of the emitted substances on a basis of the input values, with accompanying indication of distribution values, said propagation model taking into account at least one of the following factors for determining the emission location: wind direction, wind speed, temperature, inversion weather situations, road categories, emission types, structural elements, and topography between the emission location and the immission location.

* * * * *